(No Model.)

B. C. BRADLEY.
LOCKING DEVICE FOR HARROW TEETH.

No. 344,809. Patented July 6, 1886.

Witnesses:
Albert H. Adams.
O. W. Bond.

Inventor:
Byron C. Bradley

United States Patent Office.

BYRON C. BRADLEY, OF CHICAGO, ILLINOIS.

LOCKING DEVICE FOR HARROW-TEETH.

SPECIFICATION forming part of Letters Patent No. 344,809, dated July 6, 1886.

Application filed December 11, 1883. Serial No. 114,253. (No model.)

*To all whom it may concern:*

Be it known that I, BYRON C. BRADLEY, residing at Chicago, in the county of Cook and State of Illinois, and a citizen of the United States, have invented a new and useful Improvement in Locking Devices for Harrow-Teeth, of which the following is a full description, reference being had to the accompanying drawings, in which—

Figure 1:
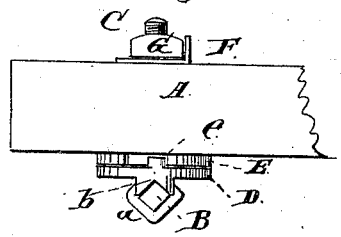
Figure 3:
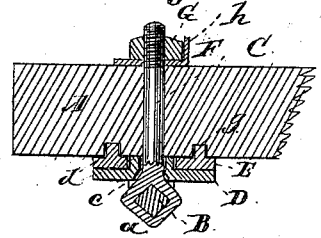
Figure 2:
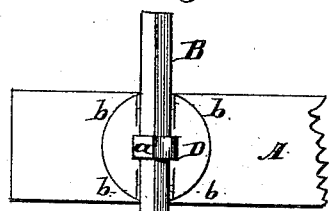
Figure 4:
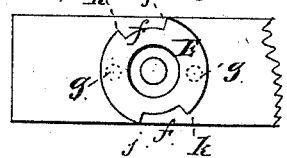
Figure 11:
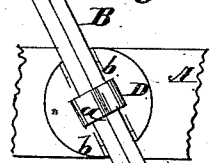
Figure 5:
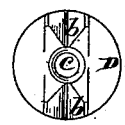
Figures 9, 10:
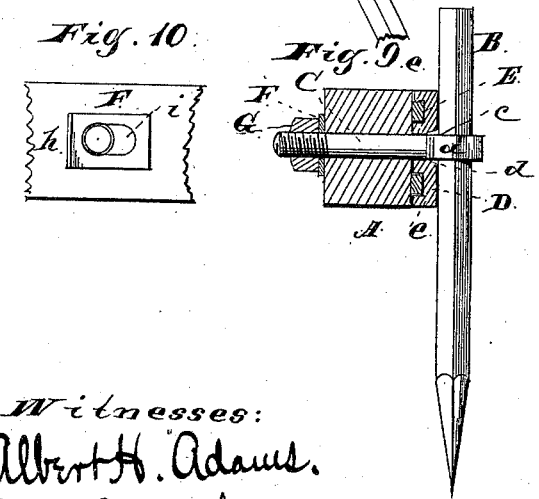

Figure 1 is a top or plan view of the end of one of the beams, with the harrow-tooth in position for use as a straight-tooth harrow; Fig. 2, a side elevation of the parts shown in Fig. 1; Fig. 3, a longitudinal cross-section through the parts shown in Fig. 1; Fig. 4, a side elevation with the tooth, its retaining-bolt, and one of the locking-plates removed; Figs. 5, 6, 7, and 8, details showing the form of the plate or disk which receives and holds the tooth; Fig. 9, a transverse section through the beam and locking-plates, with the tooth and bolt in elevation; Fig. 10, a detail showing the lock for the nut of the attaching-bolt; Fig. 11, a detail showing the tooth in the position it occupies when used as a smoothing-harrow.

This invention relates to locking devices for harrow-teeth, by which the teeth will be retained in a vertical or inclined position, as desired, according to the use to be made thereof, and has for its object to insure the retention of the tooth, either in a vertical or inclined position, by means of a simple locking device, which can be readily applied and which will perform its work in a reliable manner; and its nature consists in the combinations of devices hereinafter described, and specifically pointed out in the claims as new.

In the drawings, A represents a harrow-beam, made of wood or other suitable material, as usual.

B is a harrow-tooth, which may be made of a rectangular piece of iron or steel, pointed, as shown, or in some other suitable manner.

C is the attaching-bolt, having a head, *a*, in which is an opening corresponding in shape to the shape of the tooth in cross-section and of dimensions somewhat larger than the tooth, to allow of the ready insertion of the tooth.

Figure 6:
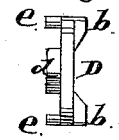
Figure 7:
Figure 8:
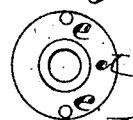

D is a plate or disk having, as shown, a circular shape, and provided on its front face with projections *b*, one on each side of the plate at its periphery, and in line one with the other, each having, as shown, a notch or recess corresponding in shape to the shape of one-half of the tooth in cross-section, as shown in Figs. 1 and 7. This plate or disk D at its center is provided with a hole for the passage of the stem of the attaching-bolt, which hole at the front is countersunk or enlarged to receive the base of the head *a*, and around this hole, on the rear face of the plate, is formed a tubular rim or flange, *d*, as shown in Figs. 3 and 6. The rear face of this plate has, near its periphery, studs or projections *e*, which studs are in line one with the other, as shown in Fig. 8.

E is a plate or disk, of a circular shape, as shown, to correspond with the shape of D, and having at its center an opening to receive the rim or flange *d*. This plate or disk E is not entire at its periphery, but has portions cut out on opposite sides in line with each other to form recesses *f*, which recesses receive the pins *e* of the plate D, and limit the rotation of the plate D; and the rear face of this plate or disk E is provided with studs or projections *g*, as shown by dotted lines in Fig. 4, which studs enter holes in the beam A, as shown in Fig. 3, and secure the plate in a firm manner to the beam.

F is a plate having on one end a turned up edge or flange, *h*, and having in its main portion a slot, *i*, as shown in Fig. 10.

G is the nut of the attaching-bolt with which the plate coacts and prevents the nut from working off as the tooth is turned, the plate passing over the end of the bolt and between the nut and the face of the beam A, as shown in Figs. 1 and 3.

The plate E is attached to the beam by driving or inserting the studs or projections *g* into the holes in the beam. The plate D is then placed in position with the flange or rim *d* in the opening of the plate E therefor, and the studs or projections *e* in the recesses *f*. The bolt is then passed through the plate D and the beam A, and the tooth inserted in the opening in the head *a*, with its sides entering the recesses in the projections *b*, and the several parts are drawn tightly together by the nut G, leaving sufficient play, however, for the tooth to turn, and when the parts are together the nut is fastened by driving the plate F down until its flange *h* engages the face of the nut on one side, locking the nut and holding the parts in their adjusted position.

In use as a straight harrow the tooth is to stand vertical, as shown in Fig. 2, in which position the studs or projections $e$ will be engaged with the end faces, $J'$, of the notches or recesses $f$, holding the tooth firmly in its vertical position against the travel of the harrow; and when the harrow is to be used for smoothing, and its travel is reversed for that purpose, such reversed travel tips the teeth over into the position shown in Fig. 11, in which position the studs or projections $e$ will engage with the end faces, $k$, of the notches or recesses $f$, holding the tooth firmly in its inclined position and limiting the falling movement. The flange or rim $d$ furnishes a bearing to receive the strain in use, thereby preventing ill effects of the strain on the attaching-bolt.

The teeth can be readily removed for repairs by simply driving back the locking-plate F and loosening the nut G, leaving the bolt in position for removal of the tooth, and when repaired the tooth is replaced and the nut tightened and locked by the plate F.

The devices are very simple in construction, can be readily applied, and furnish a means by which the tooth is held firmly in position, and at the same time is free to turn, as required. The plates D and E furnish the bearing-surface for turning, and the flange or bearing $d$ takes the strain in use from off the bolt, and when together, by means of the locking-plate F, the parts are held securely, as the nut cannot turn off by the turning of the bolt as the tooth changes position.

What I claim as new, and desire to secure by Letters Patent, is—

1. The combination of the bolt C, the plate D, provided on its front face with projections $b$, in line with each other and notched to receive the side of a tooth, and on its rear face with a flange, $d$, around the bolt-opening, and with studs $e$, the plate E, formed at its center with an opening to receive the flange $d$, and at its periphery with recesses $f$, to receive pins $e$, and the nut G, for securing a harrow-tooth in position, substantially as described.

2. The beam A, tooth B, bolt C, and nut G, in combination with the plate D, provided on its front face with projections $b$, in line with each other and notched to receive the side of a tooth, and on its rear face with a flange, $d$, around the bolt-opening, and with studs $e$, and the plate E, formed at its center with an opening to receive the flange $d$, at its periphery with recesses $f$, to receive the pins $e$, and on its rear face with studs $g$, to enter beam A, substantially as and for the purpose set forth.

BYRON C. BRADLEY.

Witnesses:
ALBERT H. ADAMS,
O. W. BOND.